US007904092B2

(12) United States Patent
Hart et al.

(10) Patent No.: US 7,904,092 B2
(45) Date of Patent: Mar. 8, 2011

(54) LOCALLY ADJUSTED RADIO FREQUENCY COVERAGE MAPS IN WIRELESS NETWORKS

(75) Inventors: Brian Donald Hart, Sunnyvale, CA (US); Bretton Lee Douglas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 416 days.

(21) Appl. No.: 11/619,939

(22) Filed: Jan. 4, 2007

(65) Prior Publication Data

US 2008/0166973 A1    Jul. 10, 2008

(51) Int. Cl.
*H04W 40/00* (2009.01)
(52) U.S. Cl. .................. 455/446; 455/422.1; 455/67.11
(58) Field of Classification Search .................. 455/446, 455/422.1, 67.11
See application file for complete search history.

(56) References Cited

U.S. PATENT DOCUMENTS

| | | | |
|---|---|---|---|
| 4,254,467 A | 3/1981 | Davis et al. | |
| 5,028,848 A | 7/1991 | Bankston et al. | |
| 5,327,144 A | 7/1994 | Stilp et al. | |
| 5,394,158 A | 2/1995 | Chia | |
| 5,396,582 A | 3/1995 | Kahkoska | |
| 5,564,079 A | 10/1996 | Olsson | |
| 5,570,412 A | 10/1996 | LeBlanc | 455/456.2 |
| 5,666,662 A | 9/1997 | Shibuya | |
| 5,717,406 A | 2/1998 | Sanderford et al. | 342/457 |
| 5,732,354 A | 3/1998 | MacDonald | |
| 6,112,095 A | 8/2000 | Wax et al. | |
| 6,115,605 A | 9/2000 | Siccardo et al. | |
| 6,134,338 A | 10/2000 | Solberg et al. | |
| 6,134,448 A | 10/2000 | Shoji et al. | |
| 6,140,964 A | 10/2000 | Sugiura et al. | |
| 6,167,274 A | 12/2000 | Smith | |
| 6,198,935 B1 | 3/2001 | Saha et al. | |
| 6,212,391 B1 | 4/2001 | Saleh et al. | |
| 6,226,400 B1 | 5/2001 | Doll | |
| 6,236,365 B1 | 5/2001 | LeBlanc et al. | |
| 6,243,811 B1 | 6/2001 | Patel | |
| 6,249,252 B1 | 6/2001 | Dupray | |
| 6,269,246 B1 | 7/2001 | Rao et al. | |

(Continued)

OTHER PUBLICATIONS

Hiroshi Akima, "Algorithm 760: Rectangular-Grid-Data Surface Fitting that Has the Accuracy of a Bicubic Polynomial", ACM Transactions on Mathematical Software, vol. 22, No. 3, Sep. 1996, pp. 357-361.*

(Continued)

*Primary Examiner* — Kent Chang
*Assistant Examiner* — Ronald Eisner
(74) *Attorney, Agent, or Firm* — Baker Botts L.L.P.

(57) ABSTRACT

In one embodiment, a method for adjusting a radio-frequency coverage map. The method includes receiving calibration data comprising observed received signal strength values at one or more calibration points corresponding to a radio frequency transmitter, and identifying an applicable coverage map, where the coverage map provides, for the radio frequency transmitter, estimated received signal strength values at one or more locations. The method also includes determining one or more offset values at the one or more calibration points, where an offset value is based on a difference between an observed received signal strength value and an estimated received signal strength value at a given calibration point. The method also includes adjusting one or more estimated received signal strength values at one or more location bins of the coverage map based on a distance from the one or more calibration points and the one or more offset values.

20 Claims, 5 Drawing Sheets

U.S. PATENT DOCUMENTS

| | | | |
|---|---|---|---|
| 6,272,541 B1 | 8/2001 | Cromer et al. | |
| 6,275,190 B1 | 8/2001 | Sugiura et al. | |
| 6,282,427 B1 | 8/2001 | Larsson et al. | |
| 6,304,218 B1 | 10/2001 | Sugiura et al. | |
| 6,317,599 B1 | 11/2001 | Rappaport et al. | |
| 6,317,604 B1 | 11/2001 | Kovach, Jr. et al. | |
| 6,414,634 B1 | 7/2002 | Tekinay | |
| 6,415,155 B1 | 7/2002 | Koshima et al. | |
| 6,441,777 B1 | 8/2002 | McDonald | |
| 6,456,892 B1 | 9/2002 | Dara-Abrams et al. | |
| 6,526,283 B1 | 2/2003 | Jang | |
| 6,556,942 B1 | 4/2003 | Smith | |
| 6,581,000 B2 | 6/2003 | Hills et al. | |
| 6,631,267 B1* | 10/2003 | Clarkson et al. | 455/446 |
| 6,664,925 B1 | 12/2003 | Moore et al. | |
| 6,679,903 B2 | 1/2004 | Kurz | 342/463 |
| 6,704,352 B1 | 3/2004 | Johnson | |
| 6,728,782 B1 | 4/2004 | D'Souza et al. | |
| 6,754,488 B1 | 6/2004 | Won et al. | |
| 6,766,453 B1 | 7/2004 | Nessett et al. | |
| 6,799,047 B1 | 9/2004 | Bahl et al. | 455/456.1 |
| 6,804,394 B1 | 10/2004 | Hsu | |
| 6,834,180 B1* | 12/2004 | Marshall | 455/67.11 |
| 6,839,468 B1* | 1/2005 | Mitchell et al. | 382/250 |
| 6,850,946 B1 | 2/2005 | Rappaport et al. | |
| 6,990,928 B2 | 1/2006 | Kurtgis | 702/150 |
| 7,162,507 B2* | 1/2007 | Carter | 709/200 |
| 2002/0045424 A1 | 4/2002 | Lee | 455/41 |
| 2002/0102988 A1 | 8/2002 | Myllymaki | |
| 2002/0115445 A1 | 8/2002 | Myllymaki | |
| 2002/0118118 A1 | 8/2002 | Myllymaki et al. | |
| 2002/0154134 A1 | 10/2002 | Matsui | |
| 2002/0168958 A1 | 11/2002 | Ford et al. | |
| 2002/0174335 A1 | 11/2002 | Zhang et al. | |
| 2002/0176366 A1 | 11/2002 | Ayyagari et al. | |
| 2003/0117985 A1 | 6/2003 | Fujii et al. | |
| 2003/0130987 A1 | 7/2003 | Edlund et al. | |
| 2003/0135486 A1 | 7/2003 | Edlund et al. | |
| 2003/0135762 A1 | 7/2003 | Macaulay | |
| 2004/0066757 A1 | 4/2004 | Molteni et al. | 370/329 |
| 2004/0072577 A1 | 4/2004 | Myllymaki et al. | |
| 2004/0111397 A1 | 6/2004 | Chen et al. | |
| 2004/0116111 A1* | 6/2004 | Saunders | 455/423 |
| 2004/0151377 A1 | 8/2004 | Boose et al. | |
| 2004/0166878 A1 | 8/2004 | Erskine et al. | 455/456.1 |
| 2004/0176108 A1 | 9/2004 | Misikangas | |
| 2004/0186847 A1 | 9/2004 | Rappaport et al. | |
| 2004/0198373 A1 | 10/2004 | Ford et al. | |
| 2004/0198392 A1 | 10/2004 | Harvey et al. | 455/456.1 |
| 2004/0203910 A1 | 10/2004 | Hind et al. | 455/456.1 |
| 2004/0236547 A1 | 11/2004 | Rappaport et al. | |
| 2004/0259554 A1 | 12/2004 | Rappaport et al. | |
| 2004/0259555 A1 | 12/2004 | Rappaport et al. | |
| 2005/0043933 A1* | 2/2005 | Rappaport et al. | 703/1 |
| 2005/0128139 A1 | 6/2005 | Misikangas et al. | |
| 2005/0131635 A1 | 6/2005 | Myllymaki et al. | |
| 2005/0136944 A1 | 6/2005 | Misikangas et al. | |
| 2005/0185615 A1 | 8/2005 | Zegelin | 370/331 |
| 2005/0245252 A1* | 11/2005 | Kappes et al. | 455/423 |
| 2007/0206025 A1* | 9/2007 | Oka | 345/611 |

OTHER PUBLICATIONS

Paul H. C. Eilers and Brian D. Marx, "Flexible smoothing with B-splines and penalties", Statistical Science vol. 11, No. 2 (1996), 89-121.*

Hiroshi Akima, "A New Method of Interpolation and Smooth Curve Fitting Based on Local Procedures", Journal of the Association for Computing Maohlnery, vol. 17, No. 4, Oct. 1970.*

Hiroshi Akima, "Algorithm 761: Scattered-Data Surface Fitting that Has the Accuracy of a Cubic Polynomial", ACM Transactions on Mathematical Software, vol. 22, No. 3, Sep. 1996, pp. 362-371.*

Frederick L. Kitson, "An algorithm for curve and surface fitting using B-splines", Acoustics, Speech, and Signal Processing, 1989. ICASSP-89., 1989 International Conference on May 23-26, 1989 pp. 1207-1210 vol. 2 Digital Object Identifier 10.1109/ICASSP.1989. 266651.*

Seungyong Lee, George Wolberg, and Sung Yong Shin, "Scattered Data Interpolation with Multilevel B-Splines", IEEE Transactions on Visualization and Computer Graphics, vol. 3, No. 3, Jul.-Sep. 1997.*

M.J.D. Powell, "The uniform convergence of thin plate spline interpolation in two dimensions", Department of Applied Mathematics and Theoretical Physics, University of Cambridge, Silver Street, Cambridge CB3 9EW, England, Mar. 1994.*

* cited by examiner

Fig._1

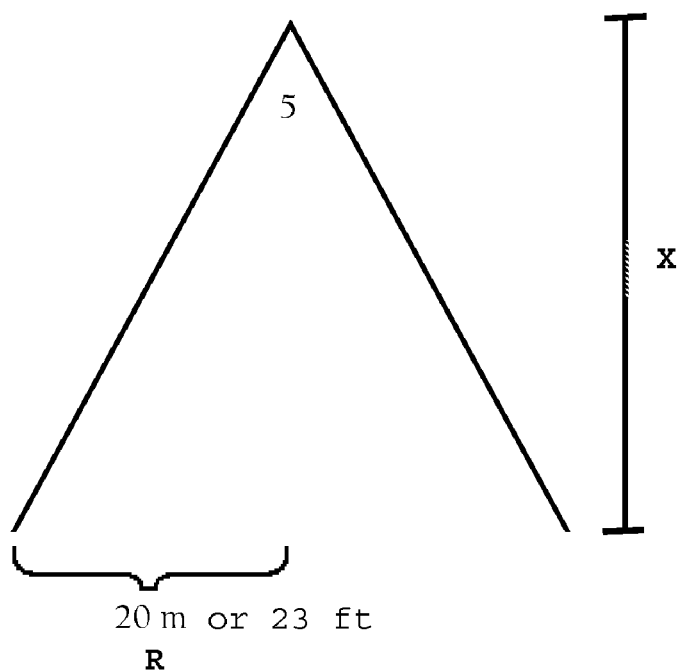
Fig._3
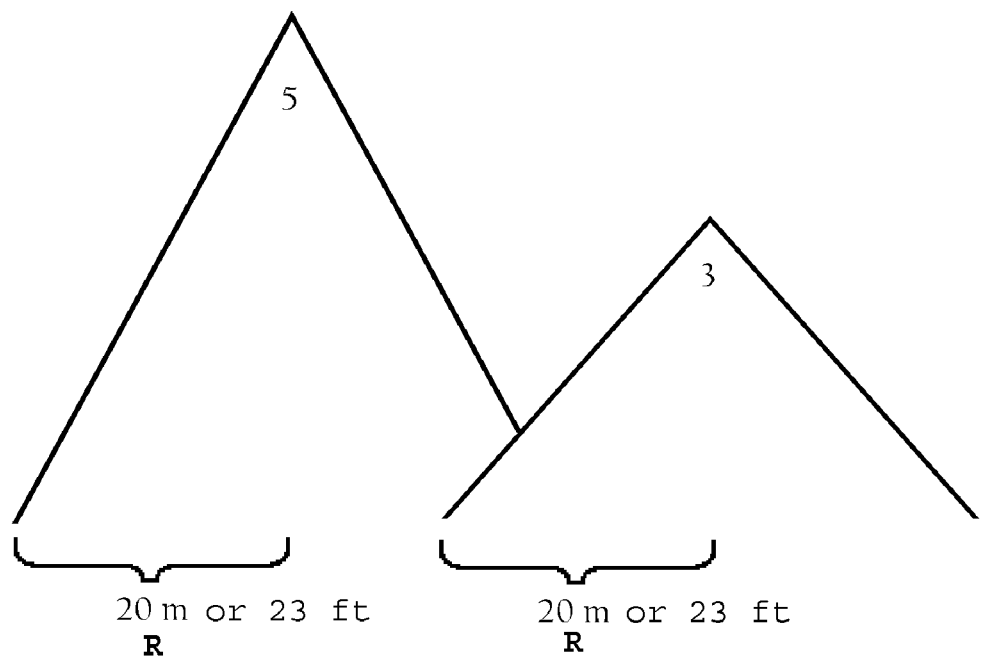
Fig._4A

LOCALLY ADJUSTED RADIO FREQUENCY COVERAGE MAPS IN WIRELESS NETWORKS

TECHNICAL FIELD

This disclosure relates generally to wireless networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network. Radio frequency (RF) coverage maps, also referred to as a heat maps, provide information regarding coverage of particular wireless access points. RF coverage maps are useful for assessing the area or region of sufficient WLAN service, and for use in locating wireless nodes. RF coverage maps are typically derived from manual site surveys and mathematical modeling techniques. Some method generate RF coverage maps based on received signal strength values associated with transmission signals exchanged between a wireless node and one or more wireless access points. Received signal strength values may be obtained at various locations to generate a coverage map for the wireless access points. RF coverage maps may also be generated by estimation algorithms using, for example, pathloss models and ray tracing. However, shadowing from nearby walls and furniture, and the multipath effects inherent to various RF environments, make high accuracy coverage maps difficult to achieve.

DESCRIPTION OF THE DRAWINGS

FIG. 3 illustrates an example of a correction cone.

FIG. 4A illustrates an example of overlapping correction cones.

DESCRIPTION OF EXAMPLE EMBODIMENTS

A. Overview

Particular embodiments of the present invention are directed to locally adjusting an RF coverage map in a wireless network. Generally, an RF coverage map is a data structure including expected or estimated received signal strength parameters for a given wireless access point at a plurality of location bins. According to one implementation, a location server obtains calibration data at selected locations corresponding to location bins of the RF coverage map. In one implementation, the calibration data may include observed received signal strength values at known locations transmitted from a wireless access point. The location server may then determine offset values at the selected location bins by comparing estimated received signal strength values in the RF coverage map to observed signal strength values. The observed signal strength values, however, may be used to adjust estimated signal strength values at surrounding locations. The location server may then generate correction cones that characterize the correction or offset to surrounding locations of the RF coverage map caused by the difference in the observed and estimated signal strength values. In one implementation, the received signal strength error changes the RF coverage map values within a radius R around a given calibration point. The amount of change at a given location equals the observed error at the center of the correction cone (also the location of the calibration point), and decreases, in one implementation, linearly from the center until it tapers to zero at the edge of the correction cone. As discussed below, the offset values that define the correction cones may be normalized and windowed. The location server then applies the correction cones to adjust one or more values of the RF coverage map.

B. Local Adjustment to RF Coverage Map

Figure 1:
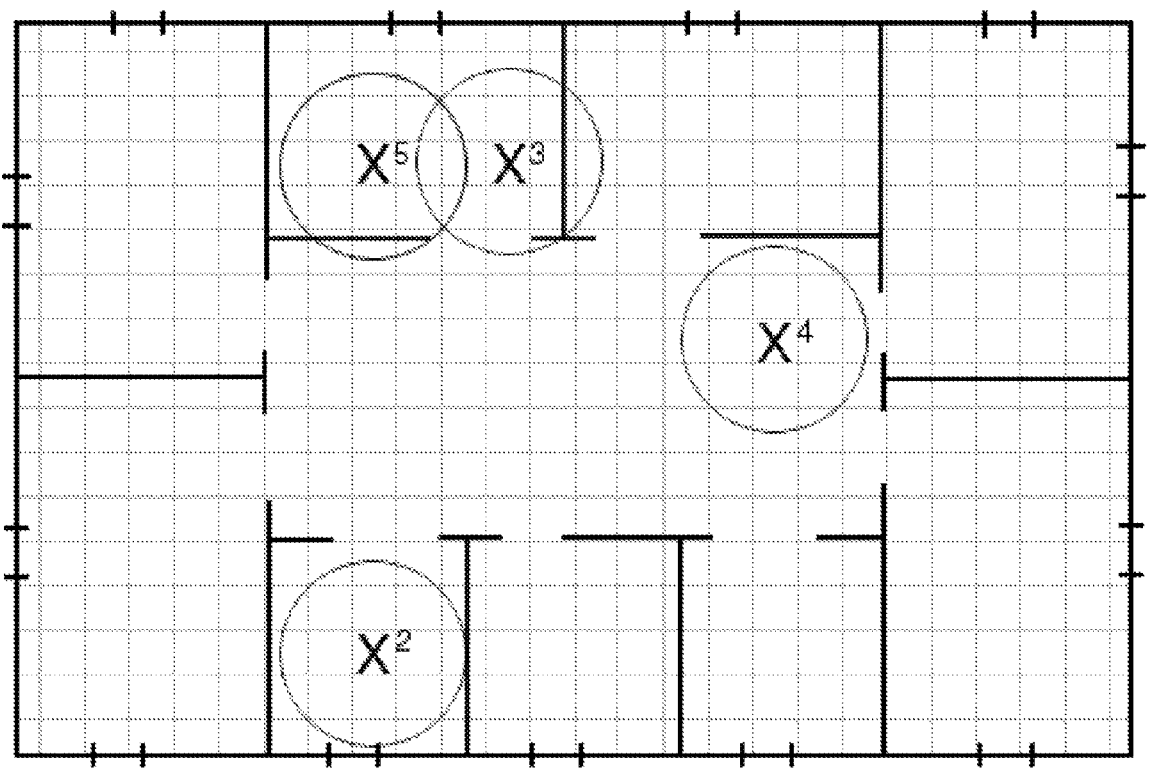
FIG. 1 illustrates an example physical space and radio frequency (RF) coverage map showing offset indications associated with several calibration points.

As discussed above, particular implementations of the invention are directed to adjusting one or more estimated received signal strength values in corresponding location bins of an RF coverage map. FIG. 1 illustrates, for didactic purposes, an example physical space and radio frequency (RF) coverage map showing the locations of several calibration points where the received signal strength of a given RF transmitter (such as an access point) have been observed. Each element of the grid (a location bin) represents a discrete region of a physical space. Each element has associated therewith an estimated receive signal strength value for wireless signals transmitted by a RF transmitter at a fixed location. A variety of methods can be used to construct the RF coverage map, such as RF modeling techniques based on the power law path loss model and ray tracing. FIG. 1 shows an example RF coverage map corresponding to a coverage area at four calibration points (labeled $X^5$, $X^3$, $X^4$, and $X^2$).

As described in more detail below, the location server may compare estimated received signal strength values with actual/observed received signal strength data at the selected location bins calibration points). The location server may generate correction cones, which provide offset values, to adjust the estimated received signal strength values of the calibration points and location bins adjacent to the calibration points without having to measure actual/observed received signal strength values at those adjacent location bins.

Figure 2:
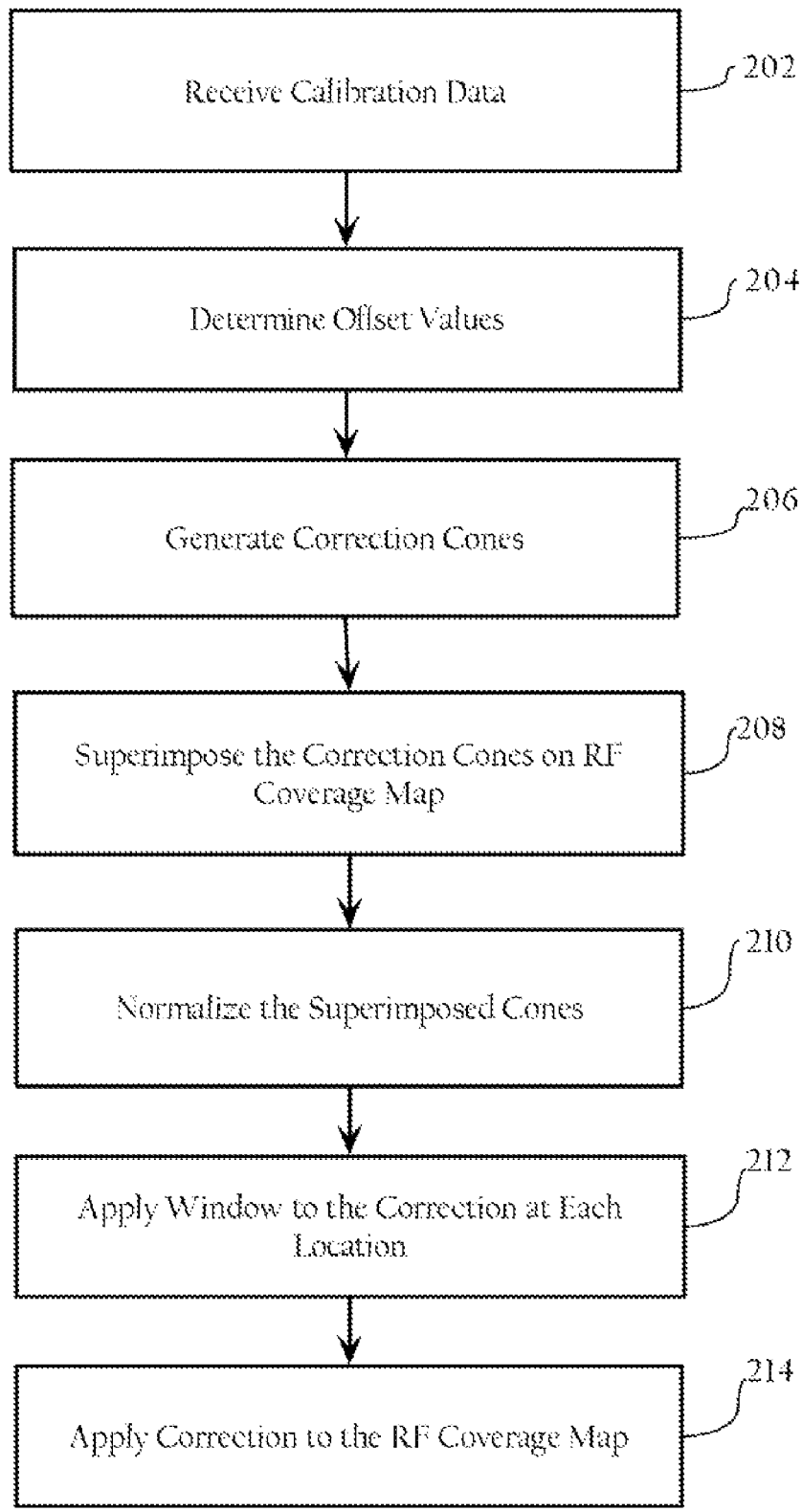
FIG. 2 illustrates an example process flow associated with adjusting an RF coverage map.

FIG. 2 illustrates an example process flow associated with adjusting an RF coverage map. The location server receives calibration data (202). In one embodiment, the calibration data may include observed received signal strength values at known locations of the RF coverage map.

The location server may then determine offset or correction values (204) at one or more of the calibration points in the RF coverage map by comparing estimated received signal strength values to the observed signal strength values. For example, an estimated received signal strength value at a given location bin may be −50 dBm, but the actual/observed received signal strength value may be −55 dBm. Accordingly, the offset or correction value at the calibration point can be computed as the difference between the two values.

In embodiment, the location server may generate correction cones (e.g. as illustrated in step 206 of FIG. 2) centered at the calibration points where observed received signal strength values were collected. FIG. 3 illustrates an example of a correction cone. A correction cone, in one implementation, is defined by a radius R, having a height X that is scaled by the magnitude of the offset value computed above. In one implementation, a correction cone may assume linear variation from vertex to base. In another implementation, a correction cone may assume a non-linear variation such as $X*\min(a/r,1)$, $X*\min(a/r^2,1)$, $X*\min(a/r^b,1)$, $X/(a+r^b)$ for constants a, b. Such a correction cone may be characterized as a surface of revolution of a linear or non-linear profile. As FIG. 3 illustrates, the correction cone tapers to a zero value as the distance from the center of the correction cone approaches the radius R. Conceptually, therefore, a positive offset value yields a correction cone that points upwardly, while a negative offset value yields a correction cone that points downwardly. As described in more detail below, the location server utilizes the correction cones to adjust received signal strength values at the calibration points and at adjacent location bins without having to measure actual received signal strength values at the adjacent location bins. As FIG. 3 shows, a cone has a base having a radius that may be predefined (e.g., 23 feet or 20 meters) and a height representing an offset/correction value (e.g., 5 dB). In one embodiment, the radius of the base may define the offset coverage associated with a particular calibration point, where an offset value may be applied to adjacent location bins within the radius. In one embodiment, the height at different portions of the cone may represent the degrees of correction (e.g., 5 dB). For example, in one embodiment, the maximum offset value may be at the center of the cone. In one embodiment, as the distance from the center increases, the offset value may decrease to a predefined value at the perimeter of the base (e.g., 0 dB). Accordingly, the correction is propagated to each location bin which the base of a given cone overlaps, and the height at of the portion of the cone that overlaps the location may determine the degree of correction.

After the correction cones are generated, the location server then superimposes the correction cones (e.g. as illustrated in 208 of FIG. 2) on the RF coverage map, as illustrated in FIG. 1. Note that some of the correction cones may overlap, especially for calibration points that are closely spaced. In other words, the location bins that surround a given calibration point may have overlapping correction cones. FIG. 4A illustrates an example of overlapping cones. As FIG. 4A shows, in one embodiment, one cone associated with one calibration point has a maximum offset value of 5 dB, and the other cone associated with another calibration point has a maximum offset value of 3 db. Both correction cones have a radius of 23 feet or 20 meters.

Figure 4B:
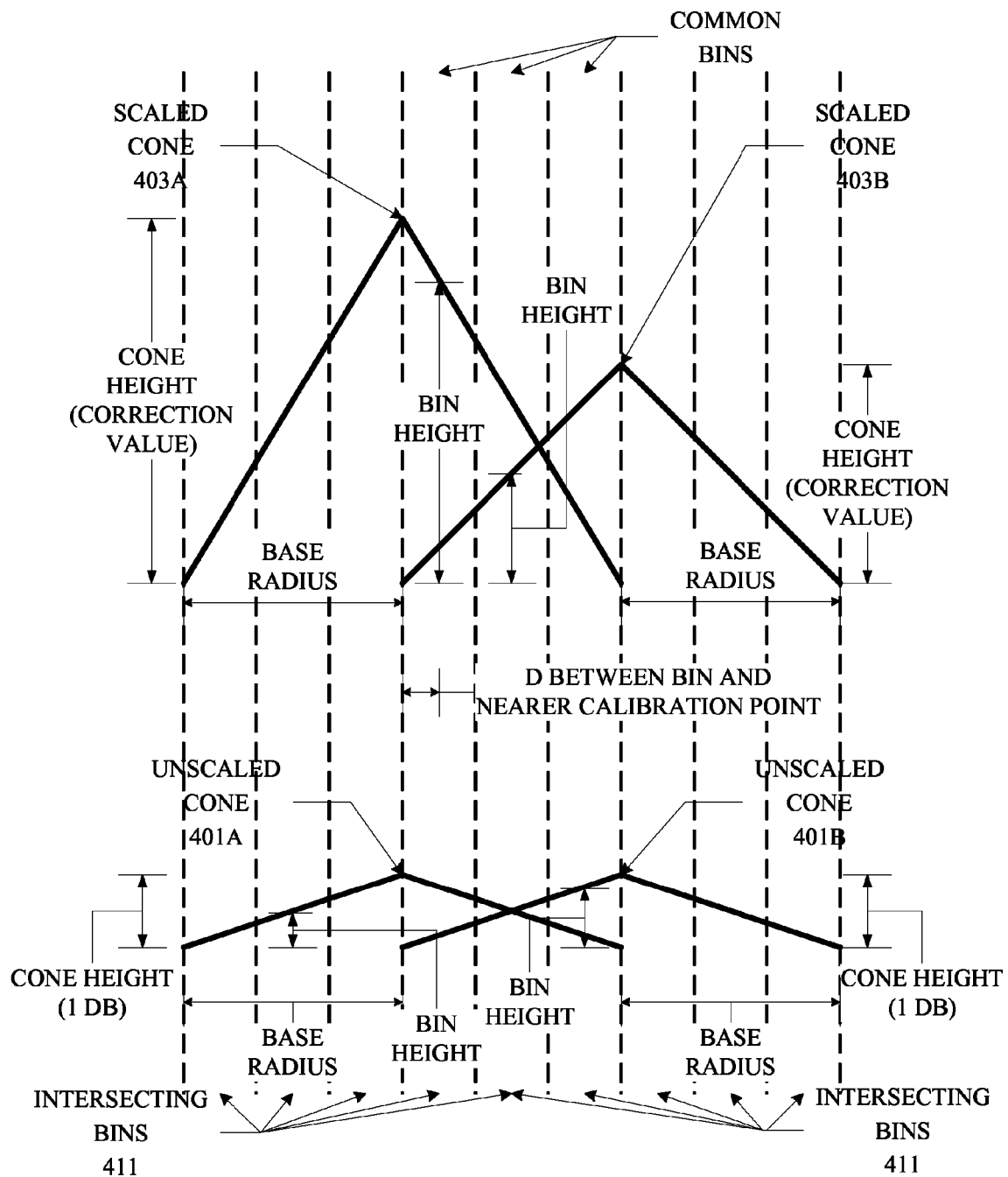
FIG. 4B graphically illustrates an example relation between the magnitude of a correction cone and a corresponding normalization factor.

When there are multiple calibration points in close proximity, the scaled cones (403) overlap and are summed at each location where there is an overlap. As well, the algorithm keeps track of the sum of unscaled cones (401), and after the cones are all overlapped, the sum of scaled cones is normalized by the sum of unscaled cones. In other words, at a given location, the value of each offset corresponding to all correction cones are summed. This value is then divided by the value of an "unscaled" correction cone (i.e., assume a correction cone having a 1 dB error at the center tapering to 0 at the radius R.) FIG. 4B illustrates the relation between two scaled correction cones, and their corresponding unscaled correction cones. As FIG. 4B illustrates, the height of a scaled correction cone, at the center of the calibration point, is the offset at the calibration point and tapers to zero at the radius R (in one implementation, 23 feet). An unscaled correction cone, on the other hand, simply tapers from 1 to zero and is centered at the corresponding calibration point. The dashed lines denote the location bins (411).

The location server may normalize the superimposed cones in the area of the overlap (210). In other words, for each location bin where correction cones overlap, the correction value (N) from each correction cone is summed. The summed values are normalized by dividing this aggregate by the sum of the corresponding unscaled cone values (D) at a given location. Repeating this for each location results in a smoothed error matrix.

The location server applies a perimeter or window to each normalized cone (e.g. as illustrated in step 212 of FIG. 2). Although the correction cones taper to zero, this behavior is lost after normalization. Therefore tapering is re-applied to the smoothed error matrix by a multiplicative 2-dimensional (2 D) taper matrix. For each location, the distance to the nearest calibration point is recorded. Zero distances have a taper factor of 1, distances above the radius R have a taper factor of 0, and distances between 0 and R vary linearly between 1 and 0. Other embodiments are possible also, such as min(1,D). The taper matrix is pointwise multiplied by the smoothed error matrix. In other words, the weight, W, can be expressed as W=max (1−D/R , 0), where D is the distance to the nearest calibration point; and R is the radius of the correction cone. The location server applies the corrections defined in the tapered and smoothed matrix to the RF coverage map to form a locally adjusted RF coverage map.

C. Example System Architecture For RF Coverage Map Generator

Figure 5:
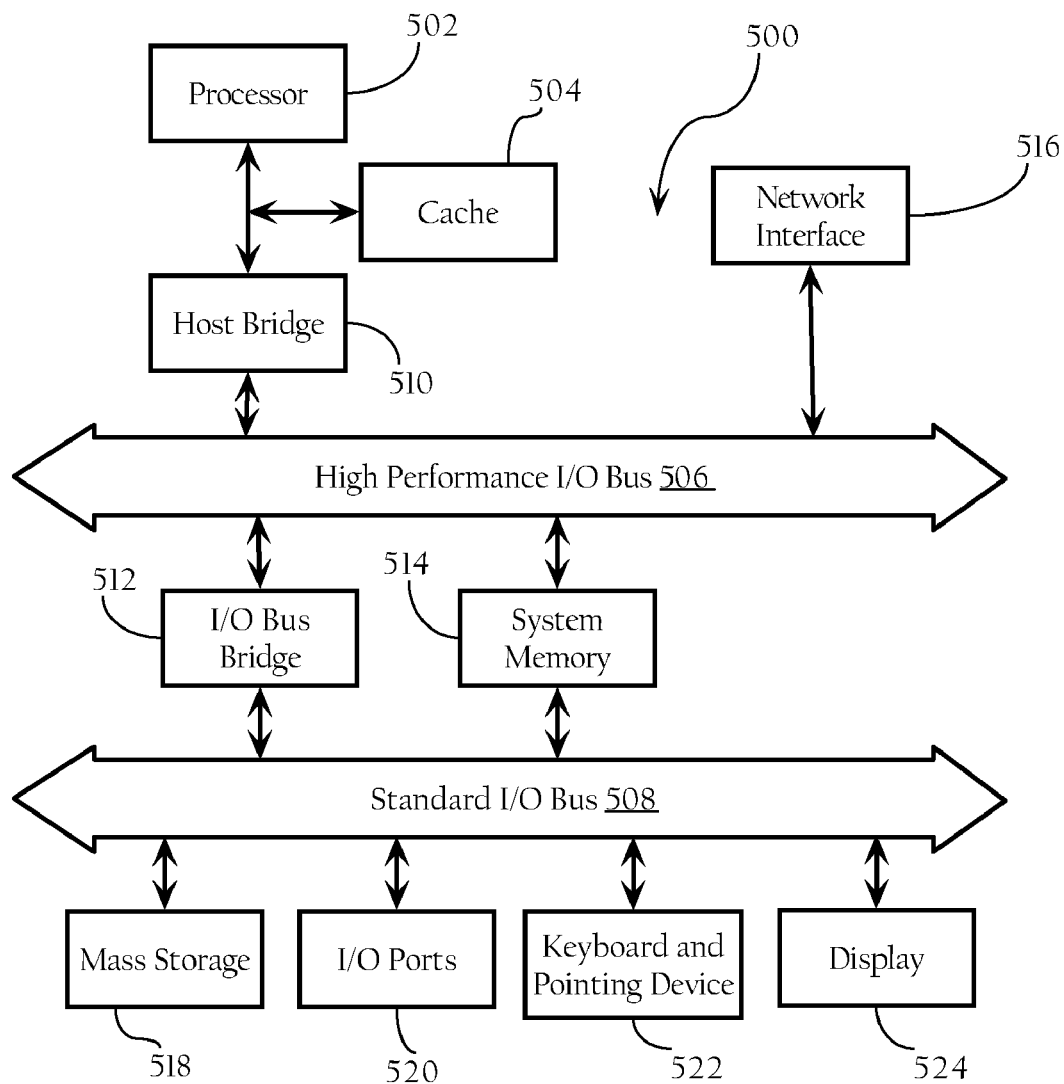
FIG. 5 illustrates an example computing system architecture that can be used to implement one or more aspects of the functionality described herein.

While particular implementations of the present invention have been described above with reference to specific embodiments, some or all of the elements or operations thereof may be implemented using a computer system having a general purpose hardware architecture. FIG. 5 illustrates an example computing system architecture, which may be used to implement the above described implementations, which may be used to perform one or more of the processes or elements described herein. In one implementation, hardware system 500 comprises a processor 502, a cache memory 504, and one or more software applications and drivers directed to the functions described herein. Additionally, hardware system 500 includes a high performance input/output (I/O) bus 506 and a standard I/O bus 508. A host bridge 510 couples processor 502 to high performance I/O bus 506, whereas I/O bus bridge 512 couples the two buses 506 and 508 to each other. A system memory 514 and a network/communication interface 216 couple to bus 506. Hardware system 500 may further include video memory (not shown) and a display device coupled to the video memory. Mass storage 518 and I/O ports 520 couple to bus 508. In one implementation, hardware system 500 may also include a keyboard and pointing device 522 and a display 524 coupled to bus 508. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, etc. Mass storage 518 provides permanent storage for the data and programming instructions to perform the above described functions implemented in the RF coverage map generator, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures; and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain implementations of the present invention may not require nor include all of the above components. For example, the peripheral devices shown coupled to standard I/O bus 508 may couple to high performance I/O bus 506. In addition, in some implementations only a single bus may exist with the components of hardware system 500 being coupled to the single bus. Furthermore, hardware system 500 may include additional components, such as additional processors, storage devices, or memories.

As discussed above, in one embodiment, the operations of the RF coverage map generator described herein are implemented as a series of software routines run by hardware system 500. These software routines comprise a plurality or series of instructions to be executed by a processor in a hardware system, such as processor 502. Initially, the series of instructions are stored on a storage device, such as mass storage 518. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 516. The instructions are copied from the storage device, such as mass storage 518, into memory 514 and then accessed and executed by processor 502.

An operating system manages and controls the operation of hardware system 500, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. One or more non-transitory, computer-readable storage media embodying software operable when executed by one or more computer systems to:
    receive calibration data comprising one or more observed received signal strength values corresponding to a radio frequency transmitter, each of the observed received signal strength values being received at one of one or more calibration points, each of the calibration points residing in one of one or more location bins;
    identify an applicable coverage map, the coverage map providing, for the radio frequency transmitter, one or more estimated received signal strength values, each of the estimated received signal strength values being estimated for one of the location bins;
    determine one or more offset values, each of the offset values being determined for one of the calibration points based on a difference between the observed received signal strength value—received at the calibration point and the estimated received signal strength value estimated for the location bin in which the calibration point resides;
    define one or more correction cones, each of the correction cones being defined for one of the calibration points with its base centered at the calibration point, its height correlating to the offset value for the calibration point, and intersecting one or more of the location bins, for each of the location bins intersecting the base of the correction cone, a first height measured from a center of the location bin to a lateral surface of the correction cone correlating to a correction value for the location bin that is a percentage of the offset value for the calibration point at the center of the base of the correction cone, the percentage being calculated based on the first height and a second height measured from the center of the base of the correction cone to an apex of the correction cone; and
    adjust the estimated received signal strength value at each of the location bins based on the correction value for the location bin.

2. The media of claim 1, wherein the software is further operable when executed by the computer systems to superimpose the correction cones onto the applicable coverage map.

3. The media of claim 1, wherein:
    a base area of a first one of the correction cones at least partially overlaps a base area of a second one of the correction cones so that the base areas of the first and second correction cones have one or more common location bins,
    each of the common location bins have a first correction value determined using the first correction cone and a second correction value determined using the second correction cone, and
    the software is further operable when executed by the computer systems to normalize the first and second correction cones, comprising:
    unscale the first and second correction cones by adjusting the second heights of the first and second correction cones to 1, for each of the location bins intersecting a base of the unscaled first correction cone, a third height measured from the center of the location bin to a lateral surface of the unscaled first correction cone correlating to a first unscaled correction value for the location bin, for each of the location bins intersecting a base of the unscaled second correction cone, a fourth height measured from the center of the location bin to a lateral surface of the unscaled second correction cone correlating to a second unscaled correction value for the location bin;
    for each of the common location bins in the overlapping base areas of the first and second correction cones,
    sum the first and second correction values for the common location bin;
    sum the first and second unscaled correction values for the common location bin; and
    divide the sum of the correction values by the sum of the unscaled correction values.

4. The media of claim 3, wherein normalizing the correction values for the common location bins results in a smoothed error matrix for the first and second correction cones.

5. The media of claim 1, wherein, for each of the correction cones, an amount that the estimated received signal strength value is adjusted decreases linearly from the apex of the correction cone, with its base centered at the calibration point having a height corresponding to the offset value of the correction cone, to a perimeter of the base, where the estimated received signal strength value is zero.

6. The media of claim 1, wherein, for each of the correction cones, an amount that the estimated received signal strength value is adjusted decreases non-linearly from the apex of the correction cone, with its base centered at the calibration point having a height corresponding to the offset value of the correction cone, to a perimeter of the base, where the estimated received signal strength value is zero.

7. The media of claim 4, the software is further operable when executed by the computer systems to:
   define a taper matrix for the normalized first and second correction cones, the taper matrix comprising one or more values each corresponding to one of the common location bins, each of the values being calculated by subtracting from 1 a distance from the corresponding common location bin to the calibration point of the first or the second correction cone that is nearer to the corresponding common location bin divided by a radius of the base of the first or the second correction cone having the nearer calibration point;
   calculate a taper correction value by multiplying the smoothed error matrix by the taper matrix;
   adjust the estimated received signal strength values at each of the location bins based on the taper correction value; and
   superimpose the normalized first and second correction cones onto the applicable coverage map.

8. The media of claim 7, wherein the taper matrix is a 2-dimensional taper matrix.

9. A method comprising:
   receiving, at one or more computer systems, calibration data comprising one or more observed received signal strength values corresponding to a radio frequency transmitter, each of the observed received signal strength values being received at one of one or more calibration points, each of the calibration points residing in one of one or more location bins;
   identifying, by the computer systems, an applicable coverage map, the coverage map—providing, for the radio frequency transmitter, one or more estimated received signal strength values, each of the estimated received signal strength values being estimated for one of the location bins;
   determining, by the computer systems, one or more offset values, each of the offset values being determined for one of the calibration points based on a difference between the observed received signal strength value received at the calibration point and the estimated received signal strength value estimated for the location bin in which the calibration point resides;
   defining, by the computer systems, one or more correction cones, each of the correction cones being defined for one of the calibration points with its base centered at the calibration point, its height correlating to the offset value for the calibration point, and intersecting one or more of the location bins, for each of the location bins intersecting the base of the correction cone, a first height measured from a center of the location bin to a lateral surface of the correction cone correlating to a correction value for the location bin that is a percentage of the offset value for the calibration point at the center of the base of the correction cone, the percentage being calculated based on the first height and a second height measured from the center of the base of the correction cone to an apex of the correction cone; and
   adjusting, by the computer systems, the estimated received signal strength value at each of the location bins based on the correction value for the location bin.

10. The method of claim 9, further comprising superimposing the correction cones onto the applicable coverage map.

11. The method of claim 10, further comprising normalizing one or more correction cones, wherein:
   a base area of a first one of the correction cones at least partially overlaps a base area of a second one of the correction cones so that the base areas of the first and second correction cones have one or more common location bins,
   determining a first correction value for each of the common location bins using the first correction cone and a second correction value determined using the second correction cone, and
   normalizing the first and second correction cones, comprising:
   unscaling the first and second correction cones by adjusting the second heights of the first and second correction cones to 1, for each of the location bins intersecting a base of the unscaled first correction cone, a third height measured from the center of the location bin to a lateral surface of the unscaled first correction cone correlating to a first unscaled correction value for the location bin, for each of the location bins intersecting a base of the unscaled second correction cone, a fourth height measured from the center of the location bin to a lateral surface of the unscaled second correction cone correlating to a second unscaled correction value for the location bin;
   for each of the common location bins in the overlapping base areas of the first and second correction cones,
   summing the first and second correction values for the common location bin;
   summing the first and second unscaled correction values for the common location bin; and
   divide the sum of the correction values by the sum of the unscaled correction values.

12. The method of claim 11, wherein normalizing the correction values for the common location bins results in a smoothed error matrix for the first and second correction cones.

13. The method of claim 9, wherein, for each of the correction cones, an amount that the estimated received signal strength value is adjusted decreases linearly from the apex of the correction cone, with its base centered at the calibration point having a height corresponding to the offset value of the correction cone, to a perimeter of the base, where the estimated received signal strength value is zero.

14. The method of claim 9, wherein, for each of the correction cones, an amount that the estimated received signal strength value is adjusted decreases non-linearly from the apex of the correction cone, with its base centered at the calibration point having a height corresponding to the offset value of the correction cone, to a perimeter of the base, where the estimated received signal strength value is zero.

15. The method of claim 12, further comprising:
defining a taper matrix for the normalized first and second correction cones, the taper matrix comprising one or more values each corresponding to one of the common location bins, each of the values being calculated by subtracting from 1 a distance from the corresponding common location bin to the calibration point of the first or the second correction cone that is nearer to the corresponding common location bin divided by a radius of the base of the first or the second correction cone having the nearer calibration point;
calculating a taper correction value by multiplying the smoothed error matrix by the taper matrix;
adjusting the estimated received signal strength values at each of the location bins based on the taper correction value; and
superimposing the normalized first and second correction cones onto the applicable coverage map.

16. A system comprising:
memory comprising instructions executable by one or more processors; and
one or more processors coupled to the memory and operable to execute the instructions, the one or more processors being operable when executing the instructions to:
receive calibration data comprising one or more observed received signal strength values corresponding to a radio frequency transmitter, each of the observed received signal strength values being received at one of one or more calibration points, each of the calibration points residing in one of one or more location bins;
identify an applicable coverage map, the coverage map providing, for the radio frequency transmitter, one or more estimated received signal strength values, each of the estimated received signal strength values being estimated for one of the location bins;
determine one or more offset values, each of the offset values being determined for one of the calibration points based on a difference between the observed received signal strength value received at the calibration point and the estimated received signal strength value estimated for the location bin in which the calibration point resides;
define one or more correction cones, each of the correction cones being defined for one of the calibration points with its base centered at the calibration point, its height correlating to the offset value for the calibration point, and intersecting one or more of the location bins, for each of the location bins intersecting the base of the correction cone, a first height measured from a center of the location bin to a lateral surface of the correction cone correlating to a correction value for the location bin that is a percentage of the offset value for the calibration point at the center of the base of the correction cone, the percentage being calculated based on the first height and a second height measured from the center of the base of the correction cone to an apex of the correction cone; and
adjust the estimated received signal strength value at each of the location bins based on the correction value for the location bin; and
a wireless access point operable to facilitate collection of the calibration data.

17. The system of claim 16, wherein:
a base area of a first one of the correction cones at least partially overlaps a base area of a second one of the correction cones so that the base areas of the first and second correction cones have one or more common location bins,
each of the common location bins have a first correction value determined using the first correction cone and a second correction value determined using the second correction cone, and
the server is further operable to normalize the first and second correction cones, comprising:
unscale the first and second correction cones by adjusting the second heights of the first and second correction cones to 1, for each of the location bins intersecting a base of the unscaled first correction cone, a third height measured from the center of the location bin to a lateral surface of the unscaled first correction cone correlating to a first unscaled correction value for the location bin, for each of the location bins intersecting a base of the unscaled second correction cone, a fourth height measured from the center of the location bin to a lateral surface of the unscaled second correction cone correlating to a second unscaled correction value for the location bin;
for each of the common location bins in the overlapping base areas of the first and second correction cones,
sum the first and second correction values for the common location bin;
sum the first and second unscaled correction values for the common location bin; and
divide the sum of the correction values by the sum of the unscaled correction values.

18. The system of claim 16, wherein the server is further operable to superimpose the correction cones onto the applicable coverage map.

19. The system of claim 17, wherein, normalizing the correction values for the common location bins results in a smoothed error matrix for the first and second correction cones.

20. The system of claim 16, wherein, for each of the correction cones, an amount that the estimated received signal strength value is adjusted decreases linearly from the apex of the correction cone, with its base centered at the calibration point having a height corresponding to the offset value of the correction cone, to a perimeter of the base, where the estimated received signal strength value is zero.

* * * * *